(12) United States Patent
Huber et al.

(10) Patent No.: US 11,038,404 B2
(45) Date of Patent: Jun. 15, 2021

(54) ROTARY MACHINE AND MOTOR VEHICLE

(71) Applicant: Bayerische Motoren Werke Aktiengesellschaft, Munich (DE)

(72) Inventors: Andreas Huber, Schoenberg (DE); Thinh Nguyen-Xuan, Erding (DE); Nicolas Brossardt, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 15/890,557

(22) Filed: Feb. 7, 2018

(65) Prior Publication Data
US 2018/0175704 A1 Jun. 21, 2018

Related U.S. Application Data

(63) Continuation of application No. PCT/EP2016/075598, filed on Oct. 25, 2016.

(30) Foreign Application Priority Data

Nov. 6, 2015 (DE) ................. 10 2015 221 802.3

(51) Int. Cl.
| | |
|---|---|
| *H02K 9/20* | (2006.01) |
| *F28D 15/02* | (2006.01) |
| *H02K 1/32* | (2006.01) |
| *H02K 7/00* | (2006.01) |

(52) U.S. Cl.
CPC ........... *H02K 9/20* (2013.01); *F28D 15/0233* (2013.01); *H02K 7/006* (2013.01); *H02K 1/32* (2013.01)

(58) Field of Classification Search
CPC .. H02K 9/20; H02K 9/19; H02K 1/32; H02K 9/22; F28D 15/0233; F28D 15/02
USPC ..... 310/52, 54, 57, 60 A, 61, 64; 165/88, 90
See application file for complete search history.

(56) References Cited

U.S. PATENT DOCUMENTS

| | | | | |
|---|---|---|---|---|
| 2,894,155 A | * | 7/1959 | Labastie | H02K 9/19 310/54 |
| 3,842,596 A | * | 10/1974 | Gray | F01D 5/088 165/104.25 |
| 3,952,798 A | * | 4/1976 | Jacobson | F28D 15/0233 122/366 |
| 5,283,488 A | * | 2/1994 | Ponnappan | H02K 9/20 310/54 |

(Continued)

FOREIGN PATENT DOCUMENTS

| | | |
|---|---|---|
| CN | 2149714 Y | 12/1993 |
| CN | 101199100 A | 6/2008 |

(Continued)

OTHER PUBLICATIONS

JP 59229189 A (English Translation).*

(Continued)

*Primary Examiner* — Quyen P Leung
*Assistant Examiner* — Alexander Moraza
(74) *Attorney, Agent, or Firm* — Crowell & Moring LLP

(57) ABSTRACT

A rotary machine, in particular an electric machine, has a shaft, which extends in an axial direction and which has a cavity, and a heat pipe, in which a first thermal medium is arranged. The rotary machine is characterized in that the heat pipe is designed as an annular chamber, which surrounds the cavity. Improved cooling for the rotary machine is ensured by this arrangement.

14 Claims, 1 Drawing Sheet

(56) References Cited

U.S. PATENT DOCUMENTS

| | | | | |
|---|---|---|---|---|
| 5,629,573 A | * | 5/1997 | Ponnappan | H02K 9/20 310/54 |
| 6,992,272 B2 | * | 1/2006 | Kitano | F28D 15/02 165/90 |
| 7,443,062 B2 | | 10/2008 | Dong et al. | |
| 2004/0155539 A1 | | 8/2004 | Potoradi et al. | |
| 2007/0069593 A1 | * | 3/2007 | Vasilescu | F28D 15/0233 310/54 |
| 2008/0309174 A1 | * | 12/2008 | Jockel | H02K 1/32 310/54 |
| 2009/0121561 A1 | * | 5/2009 | Gromoll | H02K 55/04 310/52 |
| 2010/0078151 A1 | * | 4/2010 | Koenigsberg | F28D 15/046 165/104.26 |
| 2012/0248907 A1 | * | 10/2012 | Chang | H02K 9/20 310/61 |
| 2014/0184011 A1 | * | 7/2014 | Kaimori | H02K 3/50 310/185 |
| 2014/0283506 A1 | * | 9/2014 | Kuroki | B32B 15/015 60/320 |
| 2014/0292121 A1 | | 10/2014 | Walser et al. | |
| 2014/0306450 A1 | | 10/2014 | Satoh et al. | |
| 2014/0318169 A1 | * | 10/2014 | Wits | F28D 15/0283 62/292 |
| 2014/0368064 A1 | | 12/2014 | Fedoseyev et al. | |
| 2016/0344263 A1 | * | 11/2016 | Back | H02K 9/20 |

FOREIGN PATENT DOCUMENTS

| | | | | |
|---|---|---|---|---|
| CN | 102171819 A | | 8/2011 | |
| CN | 202503382 U | * | 10/2012 | |
| CN | 202503382 U | | 10/2012 | |
| CN | 103947090 A | | 7/2014 | |
| DE | 36 01 089 A1 | | 5/1987 | |
| DE | 4230379 A1 | * | 3/1994 | H02K 9/20 |
| DE | 102 58 778 A1 | | 7/2004 | |
| EP | 0 152 785 A1 | | 8/1985 | |
| JP | 52043907 A | * | 4/1977 | |
| JP | 55077351 A | * | 6/1980 | |
| JP | 59229189 A | * | 12/1984 | F28D 15/0233 |
| WO | WO 2006/134057 A1 | | 12/2006 | |
| WO | WO 2010/039358 A2 | | 4/2010 | |
| WO | WO-2010054997 A1 | * | 5/2010 | B21D 26/051 |

OTHER PUBLICATIONS

JP 52043907 A (English Translation).*
DE 4230379 A1 (English Translation).*
WO-2010054997-A1 (English Translation) (Year: 2010).*
CN202503382U (English Translation) (Year: 2012).*
German-language Search Report issued in counterpart German Application No. 10 2015 221 802.3 dated Oct. 14, 2016 with partial English translation (13 pages).
International Search Report (PCT/ISA/210) issued in PCT Application No. PCT/EP2016/075598 dated Jan. 23, 2017 with English translation (6 pages).
German-language Written Opinion (PCT/ISA/237) issued in PCT Application No. PCT/EP2016/075598 dated Jan. 23, 2017 (5 pages).
Chinese Office Action issued in Chinese counterpart application No. 201680046886.0 dated Mar. 14, 2019, with partial English translation (Fifteen (15) pages).
Chinese Office Action issued in Chinese counterpart application No. 201680046886.0 dated Jul. 8, 2019, with English translation (Eleven (11) pages).

* cited by examiner

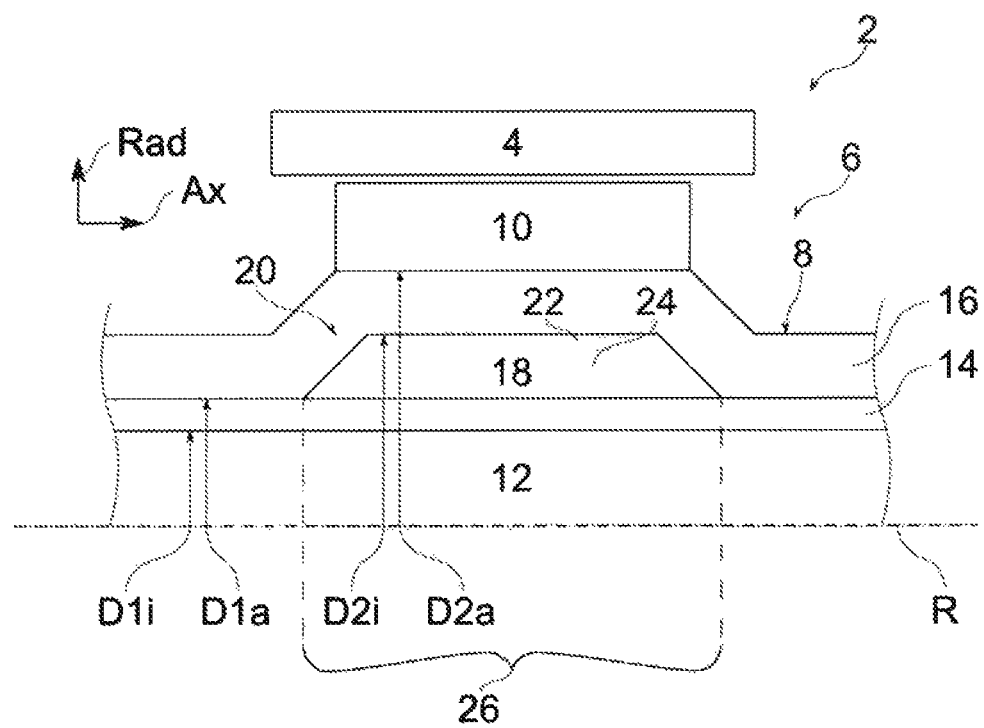

ROTARY MACHINE AND MOTOR VEHICLE

CROSS REFERENCE TO RELATED APPLICATIONS

This application is a continuation of PCT International Application No. PCT/EP2016/075598, filed Oct. 25, 2016, which claims priority under 35 U.S.C. § 119 from German Patent Application No. 10 2015 221 802.3, filed Nov. 6, 2015, the entire disclosures of which are herein expressly incorporated by reference.

BACKGROUND AND SUMMARY OF THE INVENTION

The invention relates to a rotary machine, in particular an electric machine, comprising a shaft, which extends in an axial direction and which has a cavity and a heat pipe, in which a first thermal medium is arranged. The invention furthermore relates to a motor vehicle with such a rotary machine.

A rotary machine is described, for example, in EP 0 152 785 A1.

A rotary machine generally has a fixed part, which is customarily referred to as a stator, and a rotating part, which is then referred to as a rotor. During operation, the rotor rotates about an axis of rotation. In addition, the rotor typically comprises a shaft which serves for the connection to other components or machines. A rotary machine is designed either as a driving machine, i.e. as a motor, or as a generator, and is sometimes also usable in both functions.

On account of the movable parts of the rotary machine, namely the rotor and the shaft thereof, heat is customarily generated during operation. In the event of a lack of cooling, the heat may lead to damage to the rotary machine and/or may have a negative influence on the long term efficiency thereof. Particularly in the case of rotary machines having a rapidly rotating rotor, the cooling in particular of the rotor constitutes a particular challenge. In principle, cooling of the rotor by way of air is possible. Such air cooling is firstly robust and simple to realize and to operate, but secondly is not very efficient, in particular in comparison to liquid cooling. Such liquid cooling permits a significantly greater removal of heat because of the greater heating capacity, i.e. it is significantly more efficient.

The use of a heat pipe for removing heat is also possible. A heat pipe is generally a customarily elongate container containing a thermal medium which is initially present in liquid form and evaporates when heat is supplied. A suitable configuration of the heat pipe then makes it possible to conduct heat from a warm point of the rotor to another, colder or even actively cooled point.

For example, a shaft can be designed as a hollow shaft, the interior of which then contains a heat pipe, by means of which heat is then removed in the axial direction.

The use of a heat pipe in the interior of a shaft is basically known, for example, from EP 0 152 785 A1 or from US 2014/0368064 A1. A motor can be gathered from each of the embodiments shown there, with a shaft which has a cavity, inside of which a heat pipe is arranged or which is itself designed as a heat pipe. In addition, US 2014/0368064 A1 also shows the arrangement of a plurality of heat pipes inside the shaft on a circle concentric with respect to the shaft.

By contrast, U.S. Pat. No. 7,443,062 B2 describes a motor in which a plurality of heat pipes are arranged distributed outside and in the circumferential direction around the shaft. The heat pipes each extend here through a laminated rotor core fastened to the rotor. In comparison to a hollow shaft, this has the advantage that the shaft is specifically not a hollow shaft and is therefore significantly more stable.

Taking this as the starting point, it is an object of the invention to provide a rotary machine with improved cooling. Furthermore, the intention is to provide a motor vehicle which has a driving machine with improved cooling.

This and other objects are achieved according to the invention by a rotary machine and by a motor vehicle with such a rotary machine in accordance with embodiments of the invention. The statements made herein in conjunction with the rotary machine also apply to the motor vehicle, and vice-versa.

The rotary machine is, in particular, an electric machine, and here is in particular an electric driving machine, i.e. a motor. The rotary machine has a shaft which extends in an axial direction and which has a cavity and a heat pipe. A first thermal medium is arranged in the heat pipe. According to the invention, the heat pipe is designed as an annular chamber which surrounds the cavity. In other words: the heat pipe extends in an encircling direction around the cavity and engages around the latter.

The rotary machine is preferably an electric machine and, in particular, has a stator and a rotor which, during operation, rotates about an axis of rotation. The shaft here is part of the rotor and is in particular arranged along the axis of rotation. The rotor furthermore has a laminated rotor core or the like which is connected to the shaft for rotation therewith. In addition, the shaft is of substantially rotationally symmetrical design, i.e. at least on a portion of the shaft, in which the laminated rotor core is arranged.

An aspect of the invention consists, in particular, in configuring the heat pipe in such a manner that heat is first of all removed by the latter in the radial direction and then said heat is passed into the cavity and is subsequently conducted out of the shaft in the axial direction. In the prior art cited above, e.g. EP 0 152 785 A1, the centrifugal force applied to the first thermal medium in the heat pipe is used in order, in combination with an oblique or conical inner wall of the heat pipe, to achieve conveying in the axial direction. The first thermal medium evaporates and condenses at different points which are separated from one another in the axial direction. This inevitably results in inhomogeneous cooling along the axial direction, i.e. inhomogeneous heat absorption by the first thermal medium.

In contrast thereto, in the case of the rotary machine according to the invention, the heat which is generated during operation is conveyed through the heat pipe in the radial direction, i.e. from the outside inward with respect to the shaft, and is then removed via the cavity. A particularly homogeneous and therefore improved cooling is thereby realized in the axial direction. This is achieved by the ring-like configuration of the heat pipe and by the combination with the arrangement of the heat pipe around the cavity. Overall, the shaft is therefore designed as a hollow shaft which is surrounded by a heat pipe.

In addition, the described arrangement of the heat pipe and the radial removal of heat by means of the latter permit a significantly simplified overall design of the shaft. Since no functional separation is necessary in the axial direction for removing heat, fewer boundary conditions arise for the shaft, for the design thereof, and also the rotary machine is configured more flexibly overall and is particularly simple to realize structurally.

In the case of the rotary machine described, the use of hollow shaft cooling, in particular liquid cooling, is particularly advantageous. For this purpose, in a preferred refinement, a second thermal medium is arranged in the cavity, for removing heat from the heat pipe. This combination therefore permits the abovementioned advantageous homogeneous cooling by means of the heat pipe and, at the same time, particularly powerful removal of heat in the axial direction via a cooling liquid which flows as a second thermal medium, in particular continuously, through the cavity. In principle, the use of a gas as the second thermal medium is also contemplated, but a liquid, for example water or a suitable oil, have a significantly greater cooling effect and are therefore preferred.

The annular arrangement of the heat pipe around the cavity in combination with the hollow shaft cooling also affords particular advantages over pure hollow shaft cooling without a heat pipe. In the case of pure hollow shaft cooling, there is regularly a conflict regarding the optimum configuration of the outer diameter, i.e. here the overall diameter of the shaft, and of the inner diameter, i.e. here the cavity diameter. On the one hand, a particularly small inner diameter is advantageous in order to keep the friction of the cooling medium, i.e. of the second thermal medium, against the cavity inner wall low. Secondly, a large outer diameter is advantageous in order to achieve a good transmission of torque between the shaft and the laminated rotor core. When complying with both criteria, the shaft then has a correspondingly great wall thickness and, as a result, a high weight, and also a reduced strength. By means of the heat pipe which is now, so to say, placed on, the outer diameter of the shaft is then advantageously enlarged without having to enlarge the inner diameter, and advantageously simultaneously without also having to accept a significant increase of weight because of additional solid material since the annular chamber is initially hollow and is filled only with the first thermal medium.

The heat pipe is preferably arranged concentrically with respect to the cavity. The heat pipe is designed here as a hollow cylinder and the annular chamber then forms a continuous, closed ring. The hollow cylinder is bounded in the radial direction by two cylinder lateral surfaces, namely an inner and an outer cylinder lateral surface, which are then concentric with respect to the cavity and with respect to the entire shaft, and furthermore extend in the axial direction parallel to the axis of rotation. This orientation achieves particularly homogeneous cooling in the axial direction since the centrifugal forces occurring during operation cause the first thermal medium to be pressed onto the outer cylinder lateral surface and to be distributed uniformly there.

The annular chamber is expediently only partially filled with the first thermal medium, and therefore two phases arise, in particular a liquid phase and a gas phase. During operation, the liquid phase, i.e. the first thermal medium present in liquid form, is then pushed outward. The thermal medium forms an evaporation zone there, from which the thermal medium evaporates with heat being absorbed. The evaporated thermal medium is then moved inward in the radial direction and forms a condensation zone there. The latter is advantageously cooled via the cavity and the second thermal medium arranged there, and therefore the first thermal medium condenses in the annular chamber and is pushed outward again. In this manner, the thermal medium repeatedly changes the state of aggregation and realizes transport of heat in the radial direction from the outside inward. The condensation zone and the evaporation zone are then separated from each other in the radial direction.

The annular chamber is preferably hermetically closed, and therefore no equalization of the pressure takes place and the first thermal medium cannot escape. In this manner, during the manufacturing of the shaft, a suitable annular chamber can also be optimally set and then ensures optimum removal of heat depending on the operating conditions to be expected and depending on the desired working range of the rotary machine. The annular chamber pressure depends in particular on the cooling medium used and on the desired evaporation temperature. For example, use of pure water which is intended to evaporate at, for example, 130° C. is possible. For this purpose, a positive pressure would then always have to prevail in the annular chamber. A possible positive pressure, particularly in the case of severe evaporation, customarily does not constitute a problem and is expediently taken into consideration in the design of the shaft and the annular chamber.

The shaft advantageously has an inner wall which surrounds the cavity and separates the latter from the annular chamber. The heat is then transmitted from the first thermal medium to the second thermal medium via the inner wall. For this purpose, it is advantageous to provide the inner wall with a profile toward the inside and/or towards the outside in order to obtain an enlarged interaction surface. The inner wall surrounds the cavity and thereby defines the cavity diameter, i.e. the inner diameter of the shaft. At the same time, the inner wall in particular also defines the inner cylinder lateral surface, i.e. in general the boundary of the heat pipe toward the inside, and, in this context, is a common wall of the cavity and of the annular chamber, i.e. a partition. This configuration is particularly simple. In addition, the separation of the annular chamber and of the cavity by means of merely one such partition advantageously ensures an improved transmission of heat.

In a suitable refinement, the shaft has an outer wall which surrounds the inner wall and is spaced apart on a heat pipe portion from the inner wall in a radial direction. As a result, a suitable annular chamber is then automatically formed on the heat pipe portion. Outside the heat pipe portion, the inner wall lies on the inside against the outer wall, or corresponds thereto, in such a manner that the annular chamber is sealed in relation to the surroundings.

In a particularly preferred refinement, the outer wall is of cranked design and has an enlarged diameter on the heat pipe portion. In other words, the outer wall has an inner diameter which is larger only in sections than an outer diameter of the inner wall and otherwise corresponds thereto. This refinement is particularly simple since, in order to produce the shaft, use can be made in particular of a cranked hollow shaft which is then provided with an additional inner wall.

In a particularly preferred development, the inner wall is designed as a cylindrical sleeve and is inserted into the outer wall. The shaft is therefore of two-part design, namely with an outer wall and an inner wall arranged therein. Such a configuration can be realized particularly simply since, in order to form the annular chamber, the sleeve merely has to be inserted into the outer wall. Within this context, a certain modularity of the shaft also arises, and therefore, during the manufacturing of the latter, different outer walls can be combined with different sleeves in order to optimally adjust the volume of the annular chamber and the flow cross section of the cavity depending on requirements.

Both the outer wall and the inner wall in the axial direction preferably have a wall thickness which is in each case substantially constant. In particular, the sleeve can then be produced as a cost-effective sheet metal part. The inner wall has, for example, a wall thickness within the range of 0.5 to 5 mm. The thickness of the outer wall is, for example, 4 to 20 mm.

In order to form the annular chamber, it is basically also contemplated for the outer wall to be designed as a cylindrical rectilinear sleeve and for the inner wall to then be tapered in sections, i.e. to have a reduced diameter. However, by this means, in particular the abovementioned advantage of the enlarged diameter is lost.

The use of the rotary machine as a driving machine for a motor vehicle, in particular as an electric driving machine for an electric or hybrid vehicle, is particularly advantageous. The rotary machine is then part of a drive train for propelling the motor vehicle. Driving machines in the automotive sector are generally subject to exacting requirements and have to be dynamically loadable within a frequently wide operating range over as long a period of time as possible. In the case of the above-described rotary machine, the first thermal medium in the heat pipe advantageously constitutes a buffer store for waste heat in particular of the rotor. A sudden rise in the waste heat during operation is then particularly rapidly absorbed by the heat pipe, thus resulting in an improvement in the dynamic operating range of the rotary machine and in the nominal power thereof, in particular within the meaning of the test regulation ECE R85. The rotary machine can therefore be loaded more heavily and used more efficiently because of the improved cooling.

In principle, apart from the drive, the use of the rotary machine at another point in the vehicle is also contemplated, but in particular in those cases in which customary air cooling or simple hollow shaft cooling is not suitable or sufficient and primarily in particular in the case of compact high-power driving machines having very high rotational speed.

Other objects, advantages and novel features of the present invention will become apparent from the following detailed description of one or more preferred embodiments when considered in conjunction with the accompanying drawing.

BRIEF DESCRIPTION OF THE DRAWING

The sole FIG. 1 shows schematically and partially a rotary machine in a longitudinal sectional view.

DETAILED DESCRIPTION OF THE DRAWING

FIG. 1 illustrates part of a rotary machine 2 which serves, for example, as an electric driving machine for driving a motor vehicle (not shown specifically). The rotary machine 2 has a stator 4 and a rotor 6 which rotates about an axis of rotation R during operation. The rotor 6 has a shaft 8 on which a laminated rotor core 10 is mounted and which extends in an axial direction Ax along the axis of rotation R.

The shaft 8 shown in FIG. 1 is of rotationally-symmetrical design with respect to the axis of rotation R. Furthermore, the shaft 8 is designed as a hollow shaft and comprises a cavity 12 which is cylindrical here. The cavity 12 is surrounded in the radial direction Rad by an inner wall 14 which is surrounded in turn by an outer wall 16. The inner wall 14 and the outer wall 16 each have an inner diameter D1$i$ or D2$i$ and each have an outer diameter D1$a$ or D2$a$. In the exemplary embodiment shown here, the inner wall 14 is a cylindrical sleeve which is pushed into the outer wall 16. The outer wall 16 here is of cranked design and has an enlarged diameter D2$i$, D2$a$ in sections, thus resulting in the formation of an annular chamber 18 which extends around the cavity 12 outside the inner wall 14. In the region of the annular chamber 18, the outer wall 16 is then spaced apart from the inner wall 14 by the difference between the outer diameter D1$a$ of the inner wall 14 and the inner diameter D2$i$ of the outer wall 16. In the exemplary embodiment shown here, the annular chamber 18 is approximately trapezoidal in longitudinal section. Outside the annular chamber 18, the diameters D1$a$ and D2$i$ are identical, and therefore the inner wall 14 lies against the outer wall 16. As a result, the annular chamber 18 is designed as a hermetically closed volume.

The annular chamber 18 is partially filled with a first thermal medium and thereby forms a heat pipe 20 which extends in a ring-like manner around the cavity 12. The thermal medium forms a liquid phase and a gas phase, wherein the liquid phase is pressed outward in the radial direction Rad during operation of the rotary machine 2 because of the centrifugal force which then prevails. This gives rise to an evaporation zone 22 in which the thermal medium is present in liquid form and evaporates by absorbing waste heat, for example, of the laminated rotor core 10 or of the outer wall 16. The gaseous thermal medium is then forced inward and accumulates in a condensation zone 24 which lies further inward in the radial direction Rad than the evaporation zone. In more precise terms, the condensation zone 24 is formed on the inner wall 14 which here is a partition between the cavity 12 and the annular chamber 18. On the other side of the inner wall 14, i.e. in the cavity 12, the waste heat can then be removed by means of a second thermal medium. For this purpose, the second thermal medium as cooling medium flows through the cavity 12 in the axial direction Ax and within the context of hollow shaft cooling. The first thermal medium cooled in this manner in the condensation zone 24 condenses and is driven again into the evaporation zone.

The annular chamber 18 extends in the axial direction Ax over a certain region which is also referred to as the heat pipe portion 26. On the latter, the outer wall 16 is of cranked design and is spaced apart from the inner wall 14 in order to form the annular chamber 18. The latter is designed in particular as a hollow cylinder and runs parallel to the axis of rotation, and therefore the liquid first thermal medium is pressed uniformly outward in the axial direction Ax along the entire annular chamber 18, as shown in FIG. 1, and a homogeneous cooling over the entire heat pipe portion 26 is thereby ensured. The condensation zone 24 and the evaporation zone 22 are therefore arranged one behind the other in the radial direction Rad and specifically not in the axial direction Ax. As a result, heat is transported in the heat pipe 20 in the radial direction Rad, specifically from the outside inward. The heat is then transmitted via the inner wall 14 into the cavity 12 and is removed from there in the axial direction Ax via the second thermal medium.

LIST OF REFERENCE SIGNS

2 Rotary machine
4 Stator
6 Rotor
8 Shaft
10 Laminated rotor core
12 Cavity
14 Inner wall
16 Outer wall
18 Annular chamber
20 Heat pipe
22 Evaporation zone
24 Condensation zone
26 Heat pipe portion
Ax Axial direction
Rad Radial direction R Axis of rotation
D1i Inner diameter of the inner wall
D1a Outer diameter of the inner wall
D2i Inner diameter of the outer wall
D2a Outer diameter of the outer wall The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotary machine, comprising:
   a shaft which extends in an axial direction and has a cavity, wherein an inner wall defines a diameter of the cavity and a lateral surface of the shaft; and
   a heat pipe in which a first thermal medium is arranged, wherein the heat pipe is a single closed annular chamber surrounding the cavity and having axial and radial boundaries defined by the inner wall contacting an outer wall that has a crank-shaped axial cross-section.

2. The rotary machine as claimed in claim 1, wherein a second thermal medium is arranged in the cavity, for removing heat from the heat pipe.

3. The rotary machine as claimed in claim 2, wherein the heat pipe is arranged concentrically with respect to the cavity.

4. The rotary machine as claimed in claim 1, wherein the annular chamber is only partially filled with the first thermal medium.

5. The rotary machine as claimed in claim 1, wherein the annular chamber is hermetically sealed.

6. The rotary machine as claimed in claim 1, wherein the outer wall is spaced apart on a heat pipe portion from the inner wall in a radial direction.

7. The rotary machine as claimed in claim 6, wherein the outer wall has an enlarged diameter on the heat pipe portion.

8. The rotary machine as claimed in claim 1, wherein the inner wall is a cylindrical sleeve and is inserted radially interior to the outer wall.

9. The rotary machine as claimed in claim 1, wherein the rotary machine is an electric machine, with a stator and with a rotor which encloses the shaft.

10. The rotary machine as claimed in claim 1, wherein the heat pipe is arranged concentrically with respect to the cavity.

11. The rotary machine as claimed in claim 10, wherein the annular chamber is hermetically sealed.

12. The rotary machine as claimed in claim 10, wherein the outer wall surrounds the inner wall and is spaced apart on a heat pipe portion from the inner wall in a radial direction.

13. The rotary machine as claimed in claim 12, wherein the outer wall has an enlarged diameter on the heat pipe portion.

14. A motor vehicle, comprising:
   an electric driving machine for driving the vehicle, wherein the driving machine is a rotary machine according to claim 1.

* * * * *